United States Patent [19]

Lindblad

[11] 4,341,360

[45] Jul. 27, 1982

[54] LOCKING MEANS FOR SAFETY BELTS

[76] Inventor: Stig M. Lindblad, 410 Bay La., Muskegon, Mich. 49445

[21] Appl. No.: 212,705

[22] PCT Filed: Mar. 5, 1980

[86] PCT No.: PCT/SE80/00065

§ 371 Date: Nov. 5, 1980

§ 102(e) Date: Nov. 5, 1980

[87] PCT Pub. No.: WO80/01877

PCT Pub. Date: Sep. 18, 1980

[30] Foreign Application Priority Data

Mar. 5, 1979 [SE] Sweden .................... 7901949

[51] Int. Cl.³ ............... A62B 35/02; B65H 75/48
[52] U.S. Cl. ................................... 242/107.4 A
[58] Field of Search ............... 242/107.4 R, 107.4 E; 297/478, 480; 280/806

[56] References Cited

U.S. PATENT DOCUMENTS

| 3,967,510 | 7/1976 | Lindblad | 242/107.4 A X |
| 4,018,400 | 4/1977 | Henderson | 242/107.4 A |
| 4,050,644 | 9/1977 | Fohl | 242/107.4 A |
| 4,135,410 | 1/1979 | Filderman | 242/107.4 A X |
| 4,148,447 | 4/1979 | Lindblad | 242/107.4 A |

Primary Examiner—John M. Jillions

[57] ABSTRACT

A locking mechanism for safety belts of the reel belt type and provided with a strap webbing (3), which can be unwound from a strap reel and a pawl mechanism (8), which is changeable between a position releasing the strap reel and a locking position. The device also comprises an activating mechanism (7) for the change-over of the pawl mechanism to a locked position. The activating mechanism has a body (11) of inertia with a determined basal surface (14). The body of inertia can occupy a central rest position with a basal surface resting on a carrying surface (19), or a peripheral activated position, in which the body of inertia is tilted about a first pivoting center (45). The activating mechanism also has a transmission element (12) which is provided to sense the positions of the body of inertia and to change-over the pawl mechanism (8). The activating mechanism (7) has a second pivoting center (44), about which the transmission element is arranged to pivot in connection with the change-over of the body (11) of inertia between the rest position and the activated position. The transmission element is provided with a shank (33), which in the rest position occupies a centric position relative to the axis of symmetry of the body of inertia. The same is arranged to cooperate in a third pivoting center (46) for the activating mechanism (7) with its end with a guide surface (35) in the body of inertia in such a manner that the end of the shank is moved sideways by the body of inertia when the same is moved to its activated position.

6 Claims, 5 Drawing Figures

LOCKING MEANS FOR SAFETY BELTS

TECHNICAL FIELD

The present invention relates to a locking means for safety belts of the reel belt type intended for use preferably in vehicles, and provided with a strap webbing, which against the bias of a spring can be unwound from a strap winding-up device comprising a strap reel rotatably journalled therein, a pawl mechanism, which is changeable between a position releasing the strap reel and a locking position, in which the strap reel is maintained locked against rotation in one direction, to the locking means comprises an activating means for the change-over of the pawl mechanism to a locked position, when the activating means is subjected to an acceleration exceeding a predetermined value, and comprising for one thing a body of inertia having a determined basal surface, which body can occupy a central rest position with the basal surface resting on a carrying surface, or a peripheral activated position, in which the body of inertia is tilted about a first pivoting center, and a transmission element arranged to be able to rest against a carrying surface and provided with a contact surface arranged to cooperate with the pawl mechanism and a sensor portion by cooperation with the body of inertia provided to sense its positions. The transmission element is arranged to rest against its carrying surface, when the body of inertia is in its rest position, in which the contact surface occupies a position, in which the pawl mechanism is free to occupy its releasing position, whereas the body of inertia is displaced from its rest position into the activated position, when said body of inertia is influenced by said acceleration exceeding the predetermined value, and displaces the transmission element, thereby causing a displacement of the contact surface. The pawl mechanism is arranged to occupy its locking position under the influence of the displacement of the contact surface.

BACKGROUND

Locking means of the actual kind are intended to lock, in dependence of an activating means actuated by forces of inertia, a reel with a strap webbing against the unwinding of said strap webbing wound onto said reel and to release the reel for the unwinding of said strap webbing respectively. Rigid requirements are set forth as to the function of such activating means with respect to, by way of example, reliability, sensitivity, quick response, resetting function etc., and it is an object to provide an activating means, which to the utmost possible extent can be dimensioned to produce the best result. It is further an object that the necessary angle of inclination of the activating means relative to the horizontal plane is substantially as great for the resetting operation as for the activation of the activating means. This has not been possible to achieve in a satisfactory manner, which in the first place is due to the great friction between the different parts of the activating means. Owing to this the safety belt has been maintained in locked condition during an unfavorably long period of time after the activation, which has thus meant a hindrance for the user of the safety belt.

It is therefore an object of the present invention to provide a locking means, in which the activating means can be designed in such a way that the friction forces can be kept small and substantially unchanged with respect to time. Hereby it is thus possible to provide the locking means with the best characteristics in order to fulfill great demands on the function of the means.

THE SOLUTION

The object is obtained by means of a locking means which is characterized by the combination of the activating means having a second pivoting center, about which the transmission element is arranged to pivot in connection with the change-over of the body of inertia between the rest position and the activated position, and of the sensor portion of the transmission element comprising a shank, which in the rest position occupies a centric position relative to the axis of symmetry of the body of inertia. The shank is provided at a third pivoting center for the activating means to cooperate with a guide surface of the body of inertia in such a manner that the sensor portion of the transmission element is moved sideways by the body of inertia, when the body of inertia is changed over into activated position.

BRIEF DESCRIPTION OF DRAWINGS

The invention will now be described in more detail by means of an embodiment, reference being made to the accompanying drawings, in which.

the FIGS. 3 and 4 show in partial section a locking device according to the invention in inactive and in activated position, respectively whereas

BEST MODE OF CARRYING OUT THE INVENTION

Figure 1:
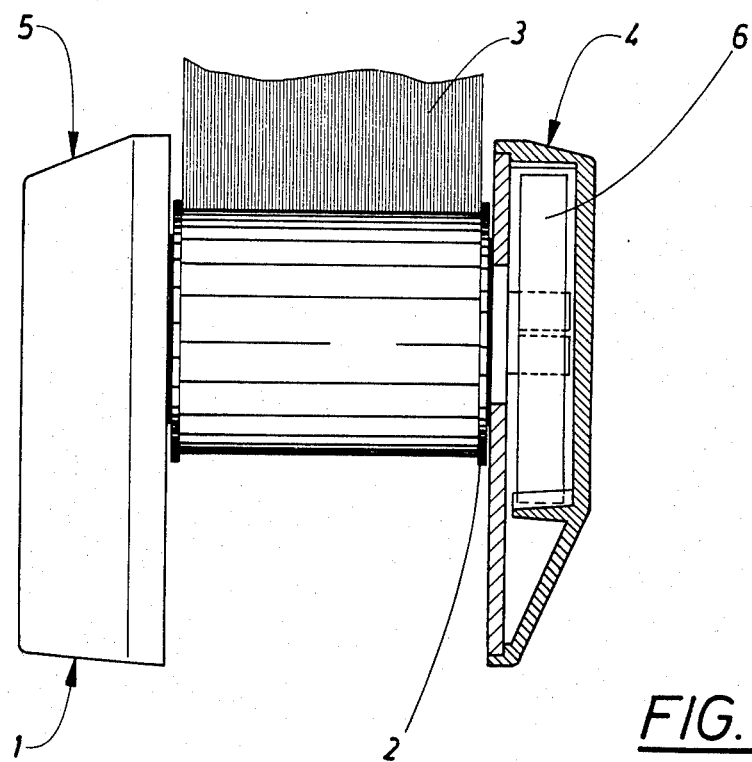
FIGS. 1 and 2 show sections through a strap winding-up device forming part of a reel type safety belt, in which the locking means according to the invention can be applied to advantage.
Figure 2:
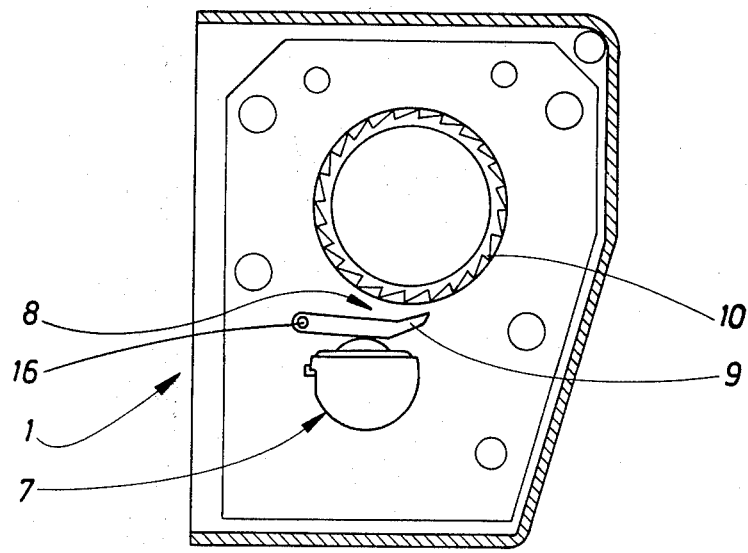

A strap winding-up device of common type, in which the locking means according to the invention can be applied to advantage, is shown schematically in FIGS. 1 and 2. According to these figures the winding-up device substantially comprises a reeel 2 to which one end of a strap 3 of the safety belt is attached. The strap wheel is pivotably journalled in two end wall elements 4, 5 and is intended to wind up and unwind respectively the strap of the belt under the actuation of a reel spring 6, which is enclosed in one of the end wall elements 4. An entirely schematically illustrated locking means is enclosed in the other end wall element 5 and substantially comprises an activating means 7 and a ratchet mechanism 8, which can be actuated by said activating means and is arranged to lock the strap reel against unwinding of the belt strap under certain conditions. The activating means according to the invention is an automatically functioning mechanism, which can be influenced by forces of inertia, and which is illustrated in more detail in the other figures. Also the ratchet mechanism 8 is shown in FIG. 2 in an entirely schematical view and in principle comprises a latching pawl 9, which is pivotably journalled about a part 16, and a ratchet tooth wheel 10. The latching pawl is intended to cooperate with the ratchet wheel 10 in order to lock it against rotation in one direction and alternatively to release the same, whereby the strap reel 2 is locked against rotation in one direction and released respectively. The above mentioned mechanism is shown in FIG. 2 very schematically for the sake of clearness, and it can in principle refer to a simple design, where the ratchet wheel 10 is fixedly secured to the strap reel 2. However, the pawl 9 must in such a design take up the load operating on the belt strap, and the ratchet mechanism 8 is in practice so provided that the illustrated mechanism is arranged to initiate a second mechanism, which relieves the pawl 9 and is intended to take up stresses in the belt strap. Such a mechanism can by way of example be arranged to be initiated also by the forces of acceleration, which arise in connection with a rapid unwinding of the belt strap. However, a more detailed description of such a mechanism has been omitted in the present application, as it is not necessary for the understanding of the function and principal design of the present invention.

Figure 3:
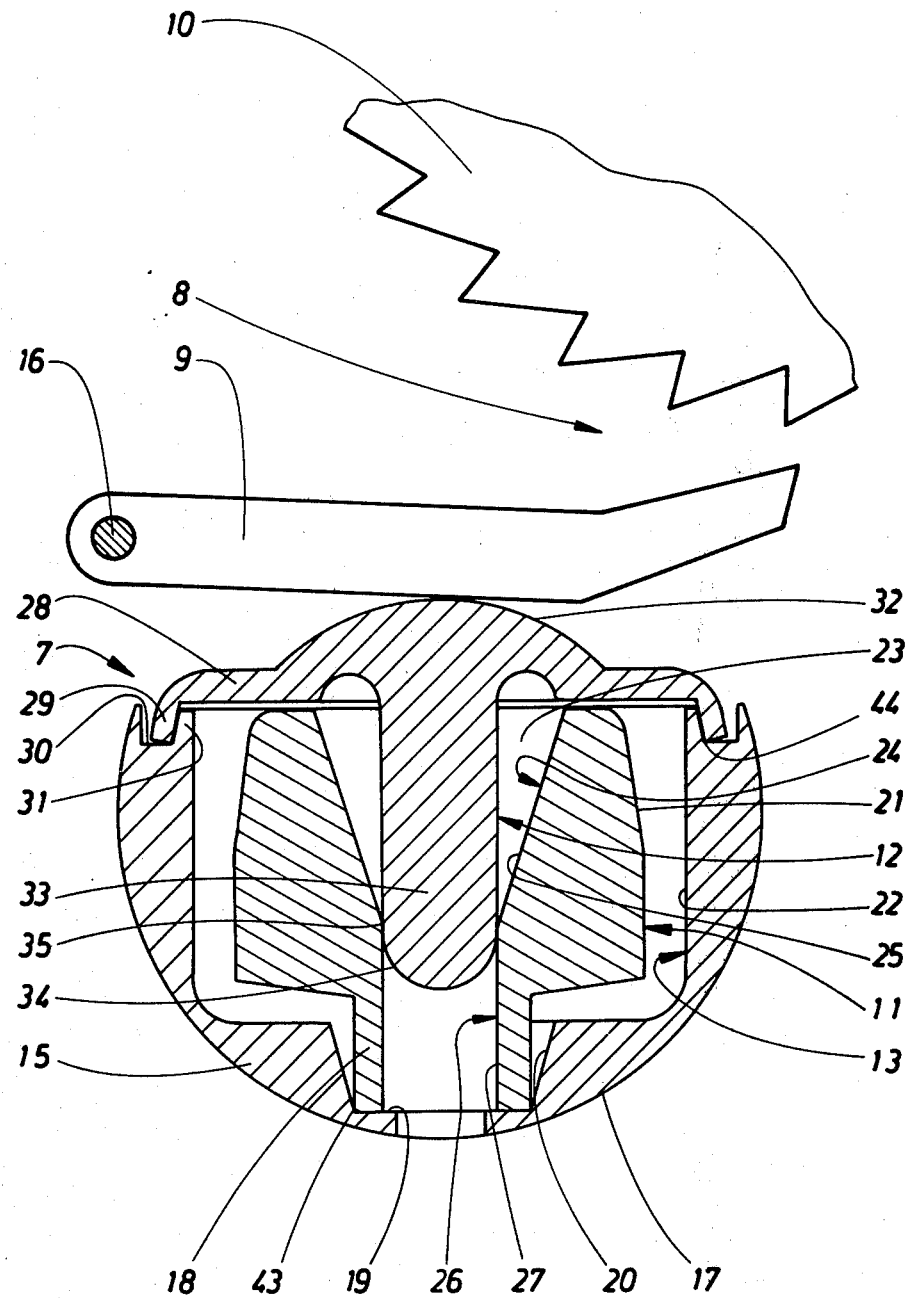
Figure 4:
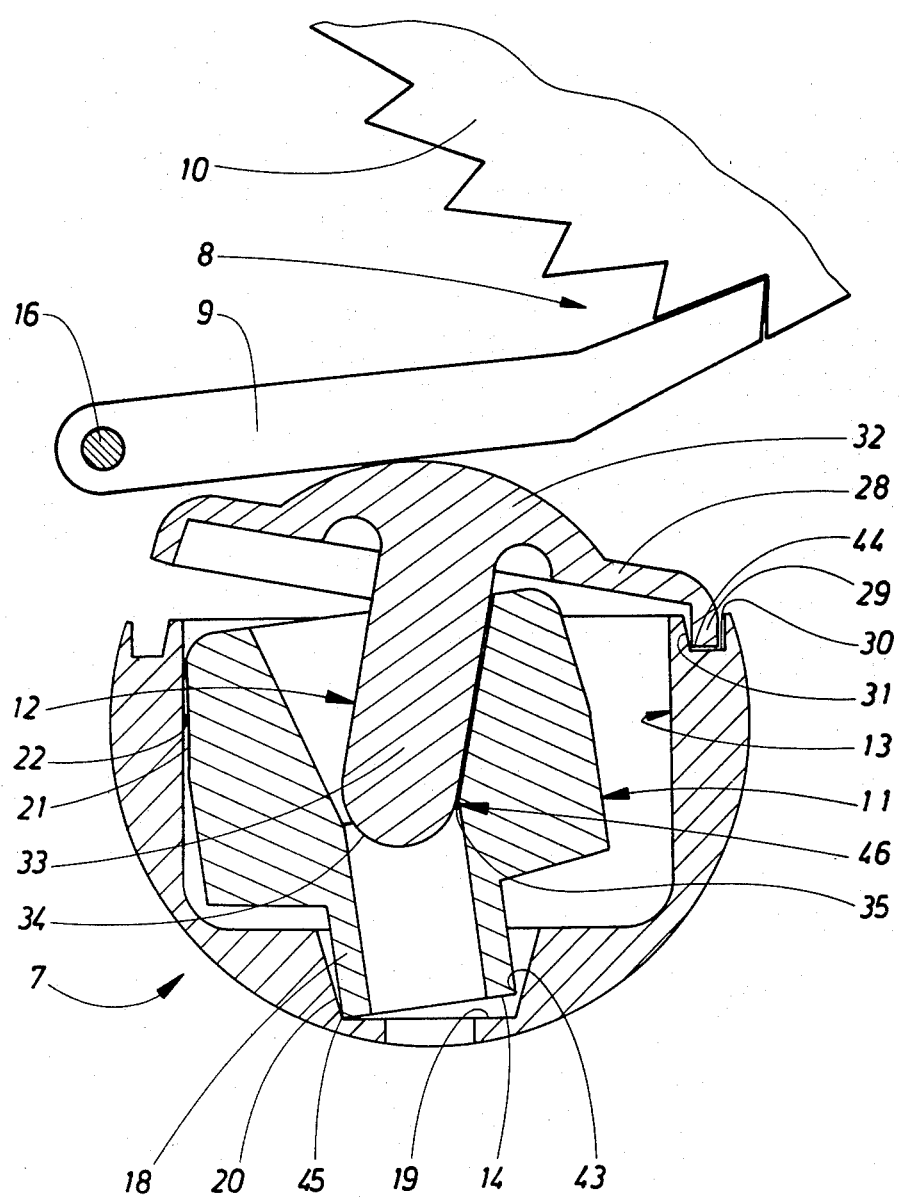
Figure 5:
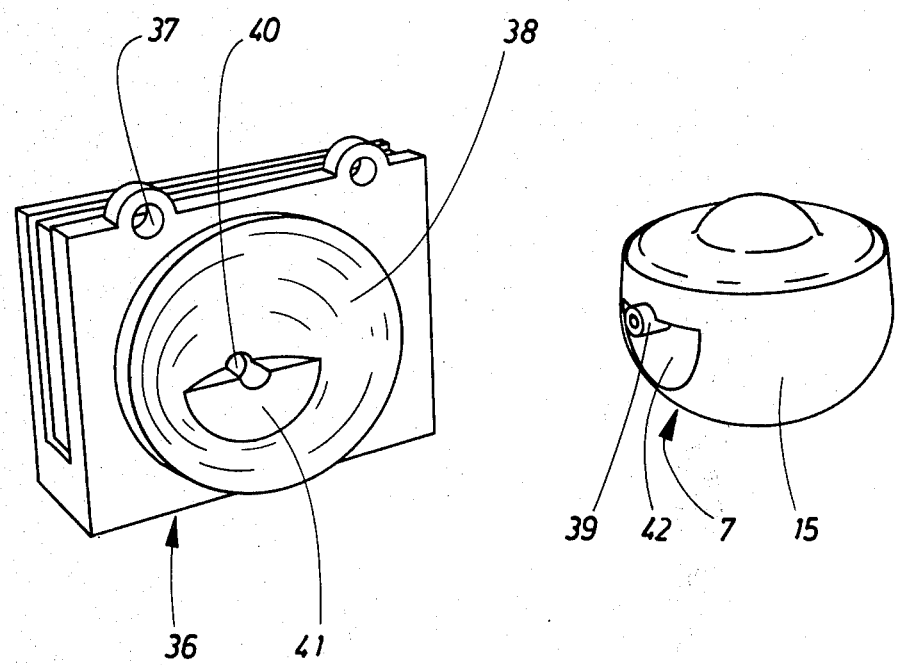
FIG. 5 shows an exploded view of a part of the locking means according to the invention.

As is best evident from FIGS. 3 and 4 the activating means 7 is substantially composed of a body 11 of inertia and a transmission element 12. The body 11 of inertia has the form of a free, standing pendulum and is made of a material of comparatively high density, by way of example of metal, such as brass or the like. The body of inertia is enclosed in a space 13 with the form of a body of revolution in a housing 15, which has an evelope surface 17 on the outside shaped as a segment of a sphere. The body of inertia is provided with a foot 18 having a basal surface 14, by means of which it is arranged in a rest position (see FIG. 3) to rest against a lower carrying surface 19, which in its periphery blends into an annular conical lower guiding edge 20. The body of inertia has in its upper portion a conical envelope surface 21 on the outside, the angle of which is substantially selected in such a manner that the body 11 of inertia in an activated tilting position (see FIG. 4) with its conical envelope wall 21 closely bears against the cylindrical envelope wall 22. The body 11 of inertia on its inside has a cavity 23, which is divided up in two sections, viz. an upper section 24 of the form of an inverted frustrum of a cone and a lower section 26 of cylindrical form and thus exhibiting a cylindrical envelope wall 27.

The transmission element 12 has a head 28, which in its upper portion covers the space 13 of the housing portion 15. The outer periphery of the head 28 of the transmission element has a downwards directed flange 29, by means of which the transmission element 28 rests against an annular upper carrying surface 30 and is in lateral direction guided by a ring-shaped guide edge 31. The head in its central portion has an upwards facing convex contact surface 32, against which rests the pawl 9. A sensor portion in the form of a shank 33 projects from the head in downwards direction and extends into the cavity 23 through the section 24 and down into the cylindrical section 26. The shank 33 has a cylindrical shape, its diameter substantially corresponding to the diameter of the cylindrical section 26, and its terminal end 34 is rounded off forming a convex portion the surface of which according to the illustrated example has the form of a segment of a sphere. The transition to the rounded-off portion is according to FIG. 3 substantially in line with a transition portion 35 serving the purpose of a guide surface and located between the conical section 24 and the cylindrical section 26 of the cavity 23. The transition portion 35 has a ring-shaped edge.

The activation means 7 is secured to the end wall element 45 of the safety belt device by means of a holder 36, which has two through holes 37 for the introduction of fastening screws or the like, by means of which the holder can be attached to the end wall element. The holder is shaped as a segment of a sphere cavity 38, of which the radius of curvature is adapted to the radius of curvature of the housing portion 15 of the activating means 7. The housing portion 15 has a laterally projecting pin 39, which is intended to penetrate into a bore 40 of the sphere-segment shaped cavity 38 in the assembled condition of the device. This cavity moreover has a projection 41 of a shape that corresponds to the shape of a recess 42 of the housing portion 15. The housing portion 15 is kept in a predetermined position relative to the holder 36 due to the position of the pin 39 in the bore 40 and the position of the projection 41 in the recess 42. A correct control of the position of the activating means 7 relative to the orientation of the vehicle is very essential for the correct function of the means. However, the reel device 1 is mounted in different angles of inclination in different vehicles according to the location of the safety belt device etc. This variation with respect to the mounting of the reel device as a whole must be compensated for by providing a correct collocation of the internal mechanism relative to the vehicle, so that the lower bearing surface 19 for the body 11 of inertia for example will be parallel to the basal plane of the vehicle. The correct collocation of the activating means 7 can then be varied in a simple manner from design to design of the reel device by means of a change of position of the projection 41 and/or the bore 40 according to the intended mounting. By changing the position of the projection 41, so that it occupies different revolving positions around the bore, a desired revolving position of the housing part 15 can thus be obtained in different positions round a revolving axis extending through the bore 40. Also different directions of this revolving axis can be obtained by changing the position of the bore 40. In each modification of the position of the activating device 7 in the holder 6 one must of course see to it that such a symmetry is obtained relative to the pawl 9 that a uniform activation is obtained for all imaginable tilting directions of the body 11 of inertia.

The locking means according to the invention functions in the following manner. In connection with the movement of a vehicle provided with the locking means according to the invention, the activating means is in its rest position according to FIG. 3, when the vehicle is at standstill or moves at an acceleration below a value prescribed by the traffic authorities. This goes for acceleration components in all directions, thus, also the laterally directed forces arising when turning a curve. A prerequisite condition for the activating means 7 to occupy a rest position makes it necessary that the vehicle is on plane ground or in case of an inclined ground surface that its angle of inclination is below a certain value. The locking means is then in its releasing position, its pawl 9 not engaging the ratchet wheel 10, which is possible, because the body 11 of inertia with its foot 18 rests against its lower carrying surface 19, whereas the transmission element 12 with its flange 29 rests against the upper carrying surface 30.

When the activating means 7 is subjected to forces of acceleration in any lateral direction and exceeding a predetermined value, or when the vehicle is placed on an inclining foundation with an angle of inclination exceeding a certain value, the activating means is changed over to activated position according to FIG. 4. The body 11 of inertia then tilts about its lower annular edge 43 of its foot 18, as said edge gets support against the guide edge 20 at the carrying surface 19. The transition between the lower bearing surface 19 and the guide edge 20 forms the lower pivoting center line along which the body 11 of inertia can tilt around any one point depending upon in which direction it has been actuated. The inclination of the body 11 of inertia in the space 13 is limited by the cylindrical envelope wall 22, against which the body of inertia obtains a good suppporting contact with its conical envelope surface 21. In connection with a tilting movement of the body 11 of inertia a laterally directed force operates against the end 34 of the shank 33 of the transmission element 12. As the transmission element 12 at the same time is held with its flange 29 gripping around the guide edge 31 at the upper bearing surface 30, the transmission element is lifted up by a pivoting movement in opposite direction to the one of the body 11 of inertia, this pivoting movement taking place about a pivoting center 44, which is located at the transition between the upper annular carrying surface 30 and the ring-shaped guide edge 31. Thus, the pivoting center 44, is formed as points following a circular line. Due to the conical shape of the section 24 of the cavity 23 the pivoting movement of the transmission unit can take place about its pivoting center 44, which in the following is called the upper pivoting center. An intermediate bearing area 46 is formed between the body 11 of inertia and the transmission element 12, said bearing area thus being a result of the articulated connection of the transmission element to the body of inertia. The bearing area 46 is substantially formed by the area around the transition portion 35 between the cylindrical section 26 and the conical section 24. The end 34 of the shank 33 of the transmission element 12 in the area of transition to its rounded end pivots against said bearing area 46. As is evident when comparing the rest position of the activating device according to FIG. 3 with its activated position according to FIG. 4 only a quite insignificant displacing movement in between surfaces bearing against each other takes place at the bearing area 46, a rolling movement of the transition portion of the transmission element 12 performed against the transition portion 35 between the cylindrical and the conical section instead substantially taking place. The curved surface of the shank 33 at its end 34 permits the pivoting movement of the transmission element 12 in spite of the shank to some extent penetrating downwards into the cylindrical section 26 of the cavity 23. A slight play is assured between the shank 33 and the envelope surface 27 of the cylindrical section, so that any friction wil not arise between the surfaces.

When the transmission element 12 tilts up into the position illustrated in FIG. 4, the contact surface 32 is raised, and then the pawl is pivoted upwards into a position in which it engages the ratchet wheel 10.

In the device according to the invention it is thus essential that the friction in the bearing surfaces of the activation means is very low, which is obtained at the lower and upper pivoting centers 44, 45 respectively by a tilting of elements relative to each other without any displacing movement between surfaces bearing against each other taking place. A negligible friction arises at the intermediate bearing area, and this is due to the insignificant displacing movement arising and the small contact surface present between the body 11 of inertia and the transmission element 12. Such a condition has been obtained by means of a carefully balanced location of the intermediate bearing area 46 relative to the pivoting centers 44, 45. It has turned out to be of advantage here that the intermediate bearing area 46 as little as possible deviates from a line connecting the upper and lower pivoting centers 44, 45.

A quick change-over of the activating means to its rest position is obtained by this low friction between the elements forming part of the activating means 7. As a matter of fact it is a desired object that the activating means does not retain the locking means in locked position, but instead that the strap reel is released as soon as the body 11 of inertia is not actuated by forces of acceleration exceeding a certain value. This is generally expressed by a wording indicating that the angle of inclination relative to the horizontal plane, which the lower bearing surface 19 must have before the body of inertia again occupies its rest position from its activated position, which angle is called the reset angle, shall as much as possible be equal to the corresponding angle required for tilting of the body 11 of inertia out of its rest position, which angle is called the tilting angle. The above of course relates to a situation, in which the activating means 7 is not subjected to any forces of acceleration. As soon as possible after the activating means 7 is no longer subjected to forces of acceleration exceeding a certain value or the foundation of the vehicle assumes an angle of inclination, which is smaller than a certain value, the body 11 of inertia is thus raised back again to its rest position according to FIG. 3. In this situation the same forces are operating as when a transition takes place from the rest position to the activating position but they are now operating in opposite direction. Thus, the transmission element 12 is swung downwards about the upper pivoting center 44, and at the same time the end 34 of the shank 33 is pivoted relative to the body 11 of inertia in the manner described above, until the rest position illustrated in FIG. 3 has been reached. Thus, as a consequence of the low friction at the bearing and pivoting points, the desired reset is very quickly obtained after the conditions of activation have ceased to exist. It has turned out that by means of the activating means according to the invention a re-set angle is obtained that only by one degree deviates from the tilting angle of the activating means.

The invention is not limited to the embodiment described and shown above but can be changed within the scope of the accompanying claims. The body 11 of inertia a well as the transmisson element 12 can for example be of another shape. It can by way of example be imagined that the transmission element 12 with the end of its shank 33 rests against a carrying surface, on which it performs its tilting movement. In this case it is necessary that guide edges laterally control the lower end of the shank. The lower end can for example have a plane surface, the bearing surface of the body of inertia also being plane. It is moveover not necessary that the head 28 of the transmission element is completely closed, but can be broken and can have the annular flange 29 and the contact part 32 and the connecting elements between the flange and the contact part and the shank 33. The cavity of the body of inertia does moreover not necessarily have to be of conical shape, as it can comprise a wider, for example cylindrical portion, in which case a supporting edge is obtained at the pivoting center 46. Only one activating position has for the sake of clearness been discussed. However, all the elements forming part of the activating means, and which are shown in FIGS. 3 and 4, are forming bodies of revolution, and therefore several activating positions can occur in all imaginable lateral directions around an axis of symmetry through the body of inertia depending on the occurring directions of force.

I claim;

1. Locking means for a safety belt of the reel belt type provided with a strap webbing which against the bias of a spring can be unwound from a strap winding-up device having a strap reel rotatably journalled therein, said locking means comprising a pawl movable between a position releasing the strap reel, and a locking position in which the strap reel is maintained locked against rotation in one direction, and also comprising activating means for the moving the pawl to its locked position when the activating means is subjected to an acceleration exceeding a predetermined value, said activating means comprising a body of inertia positioned in a housing and having a base surface, said body being adapted to selectively occupy a central rest position with the base surface resting on a support surface of the housing, and a peripheral activated position in which the body of inertia is tilted about a first pivoting center, said activating means also comprising a transmission element arranged so as to be adapted to rest against an annular support surface of the housing and provided with a contact surface arranged to cooperate with the pawl and a sensor portion by cooperation with the body of inertia provided to sense its positions, and an upper portion with a peripheral, annular edge by means of which the transmission element is arranged in the resting position of the body of inertia to rest against said annular support surace positioned at the top of said housing, said transmission element in said resting position permitting the pawl to take its releasing position and when the body of inertia is repositioned to activated position the transmission element being arranged to pivot with its annular edge on said annular support surface acting as a second pivoting center, thereby providing for a displacement of said contact surface, said pawl being arranged to assume its locking position under the action of the displacement of said contact surface, wherein the improvement comprises: said sensing portion of the transmission element being a shank which in said resting position is centrally positioned relative to the axis of symmetry of the body of inertia and which projects downwards from said upper portion of the transmission element and is provided with a lateral, peripheral sensing surface for contact with the body of inertia, and said body of inertia being provided with a central cavity into which the shank projects, said cavity having a peripheral activation surface for contact with the shank, so that when the body of inertia is repositioned to its activated position said body by means of its activating surface removes the sensing surface of the shank and thereby tilts the shank, so that said contact surface will be displaced by the pivoting motion of the transmission element relative to said second pivoting center.

2. Locking means according to claim 1, wherein said activating means includes a third pivoting center substantially coinciding with the connecting line between the first and the second pivoting center.

3. Locking means according to claim 1, said cavity of the body of inertia having a cylindrical section, into which the shank with its free end penetrates to some extent, and a substantially conical section which widens from the cylindrical section, the shank, the conical section and the cylindrical section occupying such positions and being provided in such a manner relative to each other that the shank with its free end is in close contact with the walls forming the cavity and is permitted to pivot about the third pivoting center.

4. Locking means according to claim 3, wherein the free end of the shank has a convex surface.

5. Locking means according to any one of claims 1, to 4, wherein said upper portion is a head on which the contact surface occupies a central location, said annular edge of said upper portion having the shape of a flange, said annular support surface having the shape of an annular groove into which said flange projects.

6. Locking means according to claim 5, wherein said housing has the shape of a sphere-segment and is detachably mounted in a holder, said holder having a cavity in the form of a hollow sphere with the same radius of curvature as the housing, said housing having a pin and a recess, while a bore and a projection are provided in the cavity which cooperate with the pin and recess in such a manner that the housing in mounted condition is fixed in a determined position relative to the holder.

* * * * *